US008417600B2

(12) United States Patent
Degen et al.

(10) Patent No.: US 8,417,600 B2
(45) Date of Patent: Apr. 9, 2013

(54) SYSTEMS AND METHODS FOR GRADUATED SUSPICIOUS ACTIVITY DETECTION

(75) Inventors: Robert G. Degen, Parker, CO (US); Brian Prendergast, Loganville, GA (US); Scott C. Hansen, Woodcliff Lake, NJ (US)

(73) Assignee: The Western Union Company, Englewood, CO (US)

( * ) Notice: Subject to any disclaimer, the term of this patent is extended or adjusted under 35 U.S.C. 154(b) by 2568 days.

(21) Appl. No.: 10/434,409

(22) Filed: May 7, 2003

(65) Prior Publication Data

US 2003/0220878 A1 Nov. 27, 2003

Related U.S. Application Data

(63) Continuation-in-part of application No. 10/091,000, filed on Mar. 4, 2002.

(51) Int. Cl.
*G06Q 40/00* (2006.01)
(52) U.S. Cl. ............... 705/35; 705/36; 705/37; 705/38; 705/39; 705/40; 705/41; 705/42; 705/43; 705/44; 705/45
(58) Field of Classification Search ............... 705/14–21, 705/50–59; 435/320
See application file for complete search history.

(56) References Cited

U.S. PATENT DOCUMENTS

| 4,317,957 | A | * | 3/1982 | Sendrow .................... 705/71 |
| 5,949,044 | A | | 9/1999 | Walker et al. |
| 5,963,647 | A | | 10/1999 | Downing et al. |
| 6,205,436 | B1 | | 3/2001 | Rosen |
| 6,208,720 | B1 | * | 3/2001 | Curtis et al. ............. 379/114.14 |
| 6,212,266 | B1 | * | 4/2001 | Busuioc .................... 379/189 |
| 6,254,000 | B1 | | 7/2001 | Degen et al. |
| 6,418,436 | B1 | | 7/2002 | Degen et al. |
| 6,487,542 | B2 | | 11/2002 | Ebrata et al. |
| 6,516,056 | B1 | * | 2/2003 | Justice et al. ............. 379/145 |
| 2003/0050880 | A1 | | 3/2003 | Degen et al. |
| 2003/0135457 | A1 | * | 7/2003 | Stewart et al. ............. 705/39 |

* cited by examiner

*Primary Examiner* — Calvin Loyd Hewitt, II
*Assistant Examiner* — Cristina Owen Sherr
(74) *Attorney, Agent, or Firm* — Kilpatrick Townsend & Stockton LLP

(57) ABSTRACT

Systems and methods for evaluating electronic value transfers. Various of the methods include graduating a defined affinity between transactions to increasing levels of scrutiny. At an increased level of scrutiny, reports can be generated indicating suspicious activity and/or interdiction procedures can be implemented to reduce the occurrence of the detected suspicious activity. Various of the systems are tailored to implement the aforementioned methods.

9 Claims, 15 Drawing Sheets

| | Root Transactions | Transaction Package C | Transaction Package X | Transaction Package A | Transaction Package B |
|---|---|---|---|---|---|
| 511 | sNameLast | Johnson | Nelson | Jones | Jones |
| 512 | sNameMiddle | Bob | Mark | S. | S. |
| 513 | sNameFirst | Samuel | Jack | Robert | Robert |
| 514 | sPhone | 450-326-7899 | 303-457-8765 | 356-987-0987 | 123-456-9876 |
| 515 | sAddress | 5678 City Dr. | 1411 XYZ Lane | 36 Arrowhead Blvd. | 256 Downtown |
| 516 | sAgentType | CS | CS | CS | CS |
| 517 | sAgentNumber | 567899 | 223567 | 456788 | 456788 |
| 518 | sDate | 1/18/2003 | 1/18/2003 | 1/18/2003 | 1/18/2003 |
| 519 | sAmountIn | 6000.00 | 200.00 | 12500.00 | 10000.00 |
| 520 | sValueTypeIn | U.S. Dollars | U.S. Dollars | Brazilian Reales | Brazilian Reales |
| 521 | sAccountType | Credit Card | Cash | Cash | Cash |
| 522 | sAccountNumber | 5410 7890 9876 7654 | | | |
| 523 | sSSN | 123-56-8987 | | 6668889999 | 887654322 |
| 524 | sDOB | 5/9/1967 | | 10/8/1945 | 4/29/1950 |
| 525 | sIDType | Driver's License | Driver's License | Passport | Driver's License |
| 526 | sIDIssuerLocation | State of California | State of Utah | Brazil | City of Sao Paulo |
| 527 | sIDIssueLocation | California, USA | Utah, USA | Sao Paulo, Brazil | Sao Paulo, Brazil |
| 528 | sIDNumber | 78236574237S | 1056789 | 9876459746-0 | 9900432 |
| 530 | TransactionCost | 20 | 20 | 20 | 20 |
| 541 | rNameLast | Jackson | Smart | Bean | Thomas |
| 542 | rNameMiddle | Sam | P. | Thomas | K. |
| 543 | rNameFirst | Leonard | Edna | Chestet | Benjamin |
| 544 | rPhone | 415-890-7654 | 801-675-9876 | 890-987-7654 | 99-99098798421759 |
| 545 | rAddress | 3689 N. Newroad | 5467 Candide Drive | 567 Overhere Dr. | 678 Abercrombie |
| 546 | rAgentType | CS | CS | CS | CS |
| 547 | rAgentNumber | 987598 | 987651 | 987987 | 7596789065 |
| 548 | rDate | 1/20/2003 | 1/19/2003 | 1/19/2003 | 1/22/2003 |
| 549 | rAmountOut | 200 | 200.00 | 6250.00 | $3,500.00 |
| 550 | rValueTypeOut | U.S. Dollars | U.S. Dollars | U.S. Dollars | Lbs Sterling |

Figure 5

| | Root Transactions | Transaction Package C | Transaction Package X | Transaction Package A | Transaction Package B |
|---|---|---|---|---|---|
| 511 | sNameLast | Johnson | Nelson | Jones | Jones |
| 512 | sNameMiddle | Bob | Mark | S. | S. |
| 513 | sNameFirst | Samuel | Bob | Robert | Robert |
| 514 | sPhone | 450-326-7899 | 800-456-8765 | 356-987-0987 | 123-456-9876 |
| 515 | sAddress | 5678 City Dr. | 1411 XYZ Lane | 36 Arrowhead Blvd. | 256 Downtown |
| 516 | sAgentType | CS | CS | CS | CS |
| 517 | sAgentNumber | 567899 | 123567 | 456788 | 456788 |
| 518 | sDate | 1/18/2003 | 1/18/2003 | 1/18/2003 | 1/18/2003 |
| 519 | sAmountIn | 6000.00 | 200.00 | 12500.00 | 10000.00 |
| 520 | sValueTypeIn | U.S. Dollars | U.S. Dollars | Brazilian Reales | Brazilian Reales |
| 521 | sAccountType | Credit Card | Cash | Cash | Cash |
| 522 | sAccountNumber | 5410 7890 9876 7654 | | | |
| 523 | sSSN | 123-56-8987 | | 6668889999 | 887654322 |
| 524 | sDOB | 5/9/1967 | | 10/8/1945 | 4/29/1950 |
| 525 | sIDType | Driver's License | Driver's License | Passport | Driver's License |
| 526 | sIDIssuerLocation | State of California | State of Utah | Brazil | City of Sao Paulo |
| 527 | sIDIssueLocation | California, USA | Utah, USA | Sao Paulo, Brazil | Sao Paulo, Brazil |
| 528 | sIDNumber | 782365742375 | 4567890 | 9876459746-0 | 9900432 |
| 530 | TransactionCost | 20 | 20 | 20 | 20 |
| 541 | rNameLast | Jackson | Smith | Bean | Thomas |
| 542 | rNameMiddle | Sam | K. | Thomas | K. |
| 543 | rNameFirst | Leonard | Edna | Chestet | Benjamin |
| 544 | rPhone | 415-890-7654 | 801-675-9876 | 890-987-7654 | 99-9909879884421759 |
| 545 | rAddress | 3689 N. Newroad | 5467 Candide Drive | 567 Overhere Dr. | 678 Abercrombie |
| 546 | rAgentType | CS | CS | CS | CS |
| 547 | rAgentNumber | 987598 | 987987 | 987987 | 7596789065 |
| 548 | rDate | 1/20/2003 | 1/19/2003 | 1/19/2003 | 1/22/2003 |
| 549 | rAmountOut | 200 | 200.00 | 6250.00 | $3,500.00 |
| 550 | rValueTypeOut | U.S. Dollars | U.S. Dollars | U.S. Dollars | Lbs Sterling |

Figure 6

| | Root Affinities | Affinity C | Affinity A | Affinity B |
|---|---|---|---|---|
| 711 | sActualNameLastFirst | JohnsonSamuel<br>JohnsonSammy<br>JohnsonSam | JonesRobert<br>JonesBob<br>JonesBobby | JonesRobert<br>JonesBob<br>JonesBobby |
| 712 | sSoundNameLastFirst | jonsonsām | jōnzbob | jōnzbob |
| 713 | sActualNameLastFirstAgentID | JohnsonSamuel567899<br>JohnsonSammy567899<br>JohnsonSam567899 | JonesRobert456788<br>JonesBob456788<br>JonesBobby456788 | JonesRobert456788<br>JonesBob456788<br>JonesBobby456788 |
| 714 | rActualNameLastFirst | JacksonLeonard<br>JacksonLenny<br>JacksonLen | BeanChestet | ThomasBenjamin<br>ThomasBen |
| 715 | rSoundNameLastFirst | jaxōnlen | bēnchestet | tomāsben |
| 716 | rActualNameLastFirstAgentID | JacksonLeonard987598<br>JacksonLenny987598<br>JacksonLen987598 | BeanChestet987987 | ThomasBenjamin7596789065<br>ThomasBen7596789065 |
| 514 | sPhone | 420-326-7899 | 356-987-0987 | 123-456-9876 |
| 544 | rPhone | 415-890-7654 | 890-987-7654 | 99-99098798421759 |
| 717 | sLocation | Denver, Colorado | Sao Paulo, Brazil | Sao Paulo, Brazil |
| 718 | rLocation | San Diego, California | Ithaca, New York | London, England |
| 517 | sAgentID | 567899 | 456788 | 456788 |
| 547 | rAgentID | 987598 | 987987 | 7596789065 |
| 522 | sAccountID | 5410 7890 9876 7654 | | |
| 719 | sIDTypeIssuerIDNumber | DLCalifornia78236574237S | PPBrazil9876459746-0 | DLSaoPaulo9900432 |
| 524 | sDOB | 5/9/1967 | 10/8/1945 | 4/29/1950 |
| 720 | CommonAmount | 6000 | 6250 | 5000 |

|     | Root Affinities | Tier One Affinity A/B |
| --- | --- | --- |
| 711 | sActualNameLastFirst | JonesRobert<br>JonesBob<br>JonesBobby | JonesRobert<br>JonesBob<br>JonesBobby |
| 712 | sSoundNameLastFirst | jōnzbob | jōnzbob |
| 713 | sActualNameLastFirstAgentID | JonesRobert456788<br>JonesBob456788<br>JonesBobby456788 | JonesRobert456788<br>JonesBob456788<br>JonesBobby456788 |
| 714 | rActualNameLastFirst | BeanChestet | ThomasBenjamin<br>ThomasBen |
| 715 | rSoundNameLastFirst | bēnchestet | tomäsben |
| 716 | rActualNameLastFirstAgentID | BeanChestet987987 | ThomasBenjamin7596789065<br>ThomasBen7596789065 |
| 514 | sPhone | 356-987-0987 | 123-456-9876 |
| 544 | rPhone | 890-987-7654 | 99-9909879842 1759 |
| 717 | sLocation | Sao Paulo, Brazil | Sao Paulo, Brazil |
| 718 | rLocation | Ithaca, New York | London, England |
| 517 | sAgentID | 456788 | 456788 |
| 547 | rAgentID | 987987 | 7596789065 |
| 522 | sAccountID |  |  |
| 719 | sIDTypeIssuerIDNumber | PPBrazil9876459746-0 | DLSaoPaulo9900432 |
| 524 | sDOB | 10/8/1945 | 4/29/1950 |
| 720 | CommonAmount | 6250 | 5000 |

Figure 8

| Root Affinities | | Tier One Affinity D/E/F | |
|---|---|---|---|
| sActualNameLastFirst | ThomasBen<br>ThomasBenjamin | LynnEdna | SmithBill<br>SmithWilliam<br>SmithWill |
| sSoundNameLastFirst | tomãsben | lïnednä | smithwil |
| sActualNameLastFirstAgentID | ThomasBenjamin456777<br>ThomasBen456777 | LynnEdna789654 | SmithBill567889<br>SmithWilliam567889<br>SmithWill567889 |
| rActualNameLastFirst | LynnEdna | PetersonJohn | BillsWilliam<br>BillsBill<br>BillsWill |
| rSoundNameLastFirst | lïnednä | pëtersonjon | billswil |
| rActualNameLastFirstAgentID | LynnEdna789654 | PetersonJohn347987 | BillsWilliam8798785<br>BillsBill8798785<br>BillsWill8798785 |
| sPhone | 650-433-7899 | 111-111-1111 | 111-111-1111 |
| rPhone | 450-790-7654 | 876-976-1234 | 567-987-9999 |
| sLocation | London, England | Denver, Colorado | St. Thomas, VI |
| rLocation | San Diego, California | Lincoln, Nebraska | New York, New York |
| sAgentID | 456777 | 789654 | 567889 |
| rAgentID | 789654 | 347987 | 8798785 |
| sAccountID | | | |
| sIDTypeIssuerIDNumber | DLLondon45673822 | PPBrazil9876459746-0 | PPUS098098080 |
| sDOB | 3/29/1955 | 10/19/1935 | 4/16/1970 |
| CommonAmount | 2000 | 4500 | 2500 |

Figure 9

| Root Affinities | | Tier One Affinity G/H/I | |
|---|---|---|---|
| sActualNameLastFirst | JonesDoug<br>JonesDouglas | CookBill<br>CookWilliam<br>CookWill | SacksSteve<br>SacksSteven<br>SacksStephen |
| sSoundNameLastFirst | jōnzdug | cookwil | sǎksstēv |
| sActualNameLastFirstAgentID | JonesDoug56743<br>JonesDouglas56743 | CookBill78666<br>CookWilliam78666<br>CookWill78666 | SacksSteve145555<br>SacksSteven145555<br>SacksStephen145555 |
| rActualNameLastFirst | HendricksBen<br>HendricksBenjamin | JacksonLeonard<br>JacksonLenny<br>JacksonLen | WilliamsPhillip<br>WilliamsPhil |
| rSoundNameLastFirst | hendricksben | jǎxōnlen | wilǎmsfil |
| rActualNameLastFirstAgentID | HendricksBen654377<br>HendricksBenjamin654377 | JacksonLeonard987598<br>JacksonLenny987598<br>JacksonLen987598 | WilliamsPhillip156666<br>WilliamsPhil156666 |
| sPhone | 234-345-4567 | 786-567-0987 | 464-897-9877 |
| rPhone | 567-678-7890 | 987-876-7654 | 675-987-2435 |
| sLocation | Allentown, Pennsylvania | Orlando, Florida | Birmingham, Alabama |
| rLocation | Detroit, Michigan | Tucson, Arizona | Atlanta, Georgia |
| sAgentID | 56743 | 78666 | 145555 |
| rAgentID | 654377 | 987598 | 156666 |
| sAccountID | 4444 9999 99999 | | |
| sIDTypeIssuerIDNumber | DLPennsylvania8999977 | DLFlorida776554444 | PPUS98798798679986 |
| sDOB | 10/30/1975 | 3/20/1976 | 5/6/1954 |
| CommonAmount | 1000 | 20000 | 750 |

Figure 10

| Root Affinities | | Tier One Affinity A/B/D/E/F | | |
|---|---|---|---|---|
| sActualNameLastFirst | JonesRobert<br>JonesBob<br>JonesBobby | JonesRobert<br>JonesBob<br>JonesBobby | ThomasBen<br>ThomasBenjamin | LynnEdna | SmithBill<br>SmithWilliam<br>SmithWill |
| sSoundNameLastFirst | jōnzbob | jōnzbob | tomāsben | līnednā | smithwil |
| sActualNameLastFirstAgentID | JonesRobert456788<br>JonesBob456788<br>JonesBobby456788 | JonesRobert456788<br>JonesBob456788<br>JonesBobby456788 | ThomasBenjamin456777<br>ThomasBen456777 | LynnEdna789654 | SmithBill567889<br>SmithWilliam567889<br>SmithWill567889 |
| rActualNameLastFirst | BeanChestet | ThomasBenjamin<br>ThomasBen | LynnEdna | PetersonJohn | BillsWilliam<br>BillsBill<br>BillsWill |
| rSoundNameLastFirst | bēnchestet | tomāsben | līnednā | pētersonjon | billswil |
| rActualNameLastFirstAgentID | BeanChestet987987 | ThomasBenjamin7596789065<br>ThomasBen7596789065 | LynnEdna789654 | PetersonJohn347987 | BillsWilliam8798785<br>BillsBill8798785<br>BillsWill8798785 |
| sPhone | 356-987-0987 | 123-456-9876 | 650-433-7899 | 111-111-1111 | 111-111-1111 |
| rPhone | 890-987-7654 | 99-99098798421759 | 450-790-7654 | 876-976-1234 | 567-987-9999 |
| sLocation | Sao Paulo, Brazil | Sao Paulo, Brazil | London, England | Denver, Colorado | St. Thomas, VI |
| rLocation | Ithaca, New York | London, England | San Diego, California | Lincoln, Nebraska | New York, New York |
| sAgentID | 456788 | 456788 | 456777 | 789654 | 567889 |
| rAgentID | 987987 | 7596789065 | 789654 | 347987 | 8798785 |
| sAccountID | | | | | |
| sIDTypeIssuerIDNumber | PPBrazil9876459746-0 | DLSaoPaulo99900432 | DLLondon45673822 | PPBrazil9876459746-0 | PPUS098098080 |
| sDOB | 10/8/1945 | 4/29/1950 | 3/29/1955 | 10/19/1935 | 4/16/1970 |
| CommonAmount | 6250 | 5000 | 2000 | 4500 | 2500 |

| Root Affinities | | Tier One Affinity C/G/H/I | |
|---|---|---|---|
| sActualNameLastFirst | JohnsonSamuel<br>JohnsonSammy<br>JohnsonSam | JonesDoug<br>JonesDouglas | SacksSteve<br>SacksSteven<br>SacksStephen |
| sSoundNameLastFirst | jonsonsām | jōnzdug | sāksstēv |
| sActualNameLastFirstAgentID | JohnsonSamuel567899<br>JohnsonSammy567899<br>JohnsonSam567899 | JonesDoug56743<br>JonesDouglas56743 | SacksSteve145555<br>SacksSteven145555<br>SacksStephen145555 |
| rActualNameLastFirst | JacksonLeonard<br>JacksonLenny<br>JacksonLen | HendricksBen<br>HendricksBenjamin | WilliamsPhillip<br>WilliamsPhil |
| rSoundNameLastFirst | jāxōnlen | hendricksben | wilāmsfil |
| rActualNameLastFirstAgentID | JacksonLeonard987598<br>JacksonLenny987598<br>JacksonLen987598 | HendricksBen654377<br>HendricksBenjamin654377 | WilliamsPhillip156666<br>WilliamsPhil156666 |
| sPhone | 420-326-7899 | 234-345-4567 | 464-897-9877 |
| rPhone | 415-890-7654 | 567-678-7890 | 675-987-2435 |
| sLocation | Denver, Colorado | Allentown, Pennsylvania | Birmingham, Alabama |
| rLocation | San Diego, California | Detroit, Michigan | Atlanta, Georgia |
| sAgentID | 567899 | 56743 | 78666 |
| rAgentID | 987598 | 654377 | 156666 |
| sAccountID | 5410 7890 9876 7654 | 4444 9999 99999 | |
| sIDTypeIssuerIDNumber | DLCalifornia7823657421 | DLPennsylvania8999977 | PPUS9879879867986 |
| sDOB | 5/9/1967 | 10/30/1975 | 5/6/1954 |
| CommonAmount | 6000 | 1000 | 750 |

SYSTEMS AND METHODS FOR GRADUATED SUSPICIOUS ACTIVITY DETECTION

CROSS-REFERENCES TO RELATED APPLICATIONS

The present application is a Continuation-in-Part of U.S. patent application Ser. No. 10/091,000, entitled "Money Transfer Evaluation Systems and Methods", and filed by Degen et al. on Mar. 4, 2002. The aforementioned patent application is assigned to an entity common herewith, and is incorporated herein by reference for all purposes.

BACKGROUND OF THE INVENTION

This invention is related to the field of electronic financial transaction, and in particular to electronic value or money transfers. More specifically, the invention is related to systems and methods to evaluate such transactions for suspicious activities.

Electronic transactions play an important role in today's economy. Such transactions may include, for example, ACH transactions, credit card transactions, wire transfers, bank account transfers, and the like. Such transactions may be performed in a variety of ways, including, for example, by using the Internet, by using a phone to contact a service representative or an IVR system, by an in-person visit to a financial institution or money transfer location, and the like. For example, to perform a money transfer transaction a sender may visit a money transfer location and fill out a money transfer application. This application may request the sender's name, the name of the recipient and the amount of money to be transferred. This information is transmitted to a central database, and the money to be transferred is collected from the sender. When ready to receive the money, the recipient may proceed to a pick-up location and provide the proper identification. The database is accessed to confirm the recipient and the determine the amount of money to be paid to the recipient. After payment, the date and time of payment may also be transmitted to the database.

Unfortunately, it has been reported that some have attempted to abuse such money transfer systems including those associated with organized crime, drug dealers, terrorist organizations and the like. Various procedures exist to curb such abuses. For example, the United States' government has passed laws that encourage reporting of certain suspicious monetary transfer activities. See e.g., 18 U.S.C. §1956-57. However, these laws include specific reporting requirements that are well known by criminal elements, and thus easily avoided by manipulating money transfer activities to avoid detection. Recent events and the increased need for public safety have suggested a need to implement heightened monitoring of suspicious activities involving electronic financial transactions.

Hence, among other things, this invention is related to ways to monitor and evaluate transfers for value and other financial transactions in an attempt to detect potentially suspicious activities.

BRIEF SUMMARY OF THE INVENTION

The present invention includes a variety of embodiments of both systems and methods for evaluating value transfers for suspect activities, such as terrorist activities, money laundering, and the like. In various of the embodiments, methods are provided for graduating a defined affinity between two or more transactions to increasing levels of scrutiny. At an increased level of scrutiny, reports can be generated indicating suspicious activity and/or interdiction procedures can be implemented to reduce the occurrence of the detected suspicious activity. An embodiment of a system in accordance with the present invention includes a money transfer system associated with a fraud processing server. The fraud processing server is capable of accessing money transfer records associated with the money transfer system and evaluating the records in accordance with various methods disclosed herein.

One embodiment of the present invention provides a method for graduated evaluation of value transfer transactions. The method includes receiving a number of transaction packages that are associated with respective value transfers. Root node affinities are formed for each of the transaction packages. The root node affinities are compared one with another, and where matches are detected, the matching root node affinities are formed into a tier one affinity. The tier one affinity, as well as some root node affinities are compared with other tier one affinities. Where a match is detected, the matched tier one affinities, or tier one affinity and root node affinity are combined to create a common tier one affinity. Where a trigger level is reached, a tier one affinity is converted to a tier two affinity. At this point, a report can be generated indicating suspicious behavior associated with the tier two affinity. The tier two affinity is subsequently compared to tier one affinities and/or root node affinities. Where additional matches occur such as, for example, three additional matches, an interdiction can be initiated. Further, a periodic report can be generated indicating any matches occurring in relation to the tier two affinity.

Some embodiments of the present invention provide systems for evaluating value transfers. Such systems include a fraud processing computer associated with a computer readable medium. Such a computer readable medium can be a hard disk drive, a server database, a floppy disk, and/or the like. The computer readable medium comprises computer instructions executable by the fraud processing computer to receive a plurality of transaction packages, and to form a plurality of root node affinities associated with the respective transaction packages. The instructions are further executable to compare the plurality of root node affinities with a tier one affinity, and to assimilate at least one of the root node affinities into the tier one affinity based on the comparison. In particular cases, at least some of the root node affinities are compared with other root node affinities, and based on the comparison, a tier one affinity is formed from two or more of the compared root node affinities.

In various cases, the computer instructions are further executable to receive a trigger level that can be, for example, an affinity intensity, an event count, and/or an event occurrence. Thus for example, where an affinity intensity is used, a trigger may occur where the affinity intensity exceeds a defined threshold. Alternatively, where an event occurrence is used, a trigger may occur upon the presence of a prescribed event such as, for example, a transaction exceeding ten thousand dollars. As yet another alternative, where an event count is used, a trigger may occur when a defined number of events have been found such as, for example, when seven matches are found to a given tier one affinity.

Where a trigger occurs, a tier one affinity can be converted to a tier two affinity. In some cases, the tier two affinity is locked so that it will not age out of the system, but rather will remain in the system until explicitly removed. Further, upon conversion to a tier two affinity, a report indicating behavior associated with the tier two affinity can be generated. In some manifestations of the embodiment, other tier one affinities are compared to the tier two affinity, and based on the comparison, interdiction procedures can be initiated, and/or a periodic report can be generated. Further, where a tier one affinity matches the tier two affinity, the tier one affinity can be assimilated with the tier two affinity. In yet other cases, one or more root node affinities are compared with the tier two affinity, and based on the comparison, interdiction procedures can be initiated, and/or a periodic report can be generated. Further, where a root node affinity matches the tier two affinity, the root node affinity can be assimilated with the tier two affinity.

In some cases, the transaction packages are comprised of a combination of real time information and on-demand information, while in other cases, the transaction packages are comprised of either real time information or on-demand information. The methods can include assembling the real time information and the on-demand information into the appropriate transaction packages. Further, in some cases, a gross sort is performed on a plurality of transaction packages to eliminate a number of the transaction packages that are unlikely to indicate suspicious activity, or which may only indicate activity at a low level.

Other embodiments of the present invention provide methods for progressive value transfer evaluation. The methods include receiving a transaction package, and forming a root node affinity associated with the transaction package. The root node affinity can then be compared to other root node affinities, tier one affinities, and/or tier two affinities. In some cases, the root node affinity is compared to a tier one affinity, and where a match occurs, the root node affinity is assimilated with the tier one affinity. The tier one affinity can be converted to a tier two affinity based in part on the comparison with the root node affinity. A report can be generated when the conversion to the tier two affinity occurs.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 5 illustrates various exemplary transaction packages;

FIG. 6 illustrates the various exemplary transaction packages of FIG. 5 after a gross sort in accordance with some embodiments of the present invention;

FIG. 7 illustrates various root node affinities derived from the exemplary transaction packages of FIG. 6 in accordance with some embodiments of the present invention;

FIG. 8 illustrates a tier one affinity formed in accordance with embodiments of the present invention from two of the root node affinities of FIG. 7;

FIGS. 9 and 10 illustrate various previously formed tier one affinities in accordance with embodiments of the present invention; and FIGS. 11 and 12 illustrate affinities formed after application of the method of FIG. 3 in accordance with some embodiments of the present invention.

DETAILED DESCRIPTION OF THE INVENTION

Figure 1:
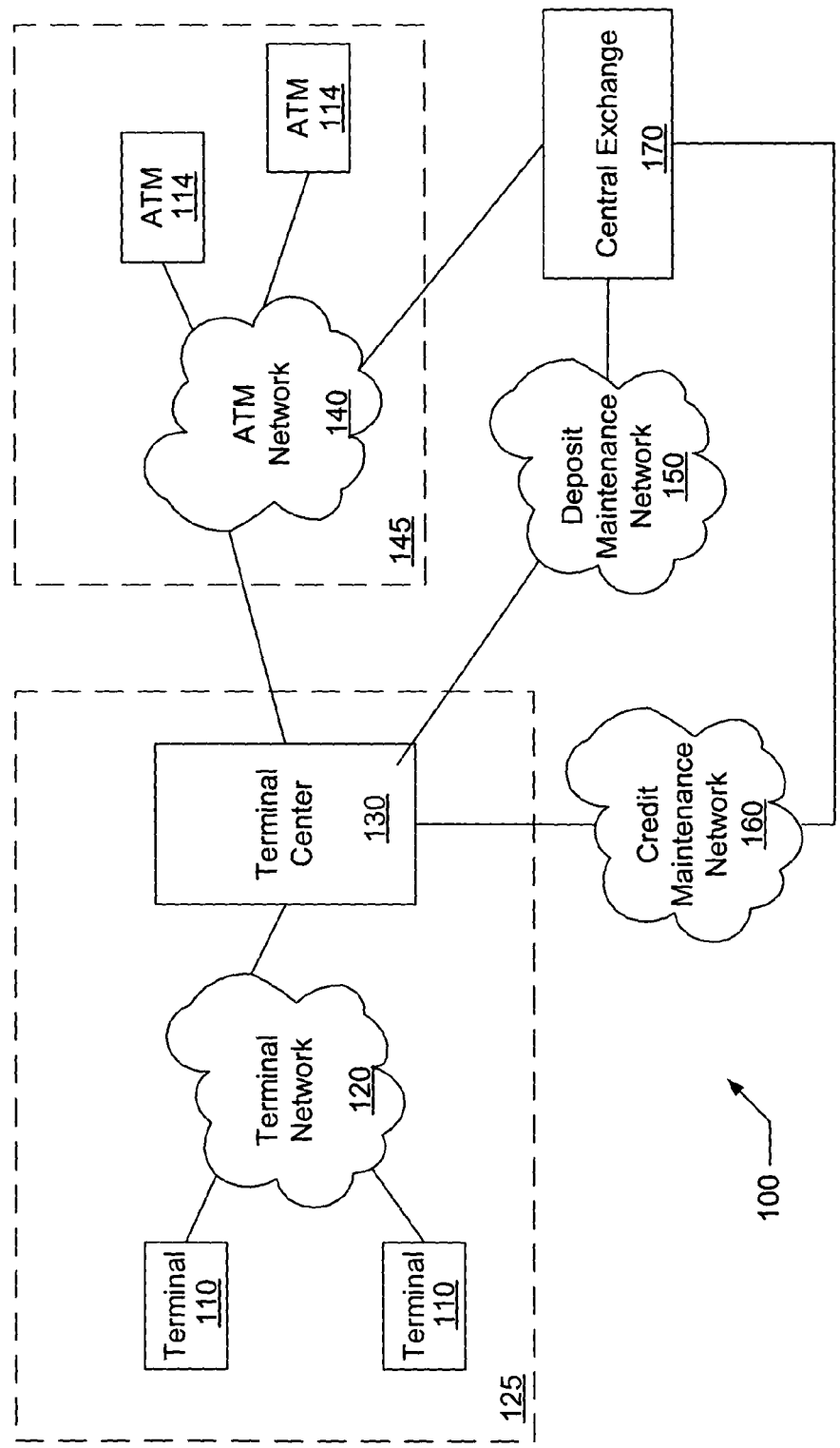
FIG. 1 illustrates a money transfer system capable of evaluation using systems and methods in accordance with the present invention.

The present invention relates to methods and systems for evaluating electronic value transfers for suspect activities, such as terrorist activities, money laundering, and the like. The electronic transfers evaluated may take a variety of forms. For example, such electronic transfers may take the form of traditional money transfers where the money to be transferred is presented at a first money transfer location and is electronically "wired" to a second money transfer location where the transferred money is paid to the recipient. Such money transfer services are provided by a number of companies, such as WESTERN UNION™. Other types of electronic transfers may include wire transfers from one financial institution to one or more other financial institutions, electronic ACH transfers, electronic transfers over networks, such as the Internet (including those described in copending U.S. patent application Ser. Nos. 10/040,568, entitled "Systems and Methods of Introducing and Receiving Information Across a Computer Network" and filed Jan. 4, 2002, which is incorporated herein by reference for all purposes; 10/037,827, entitled "Methods for Receiving Electronically Transferred Funds Using an Automated Teller Machine" and filed Jan. 3, 2002, which is incorporated herein by reference for all purposes; 09/991,497, entitled "Online Funds Transfer Method" and filed Nov. 15, 2001 on a date prior hereto, which is incorporated herein by reference for all purposes.

Further, although the invention may find its greatest use in relation to cash transfers, the present invention may be used to evaluate other types of value transfers as well. For example, the invention may be used with value transfers, such as those involving phone minutes, loyalty program points and/or awards, frequent flier miles, stored value accounts, and the like. Thus, for purposes of this document, the term money transfer is defined to include any transfer of value between entities. Such a money transfer can include a transfer of value between an entity and itself, or between an entity and one or more separate entities. For example, a money transfer can include a transfer of value between a first person and a second person, between a person and a corporation, between a first corporation and a second corporation, and/or between a corporation and itself. Such money transfers can include providing value and/or information such as, cash, checks, stored value cards, credit cards, debit cards, cash cards, a bank account number, a frequent flyer account number, a cellular telephone account number, and the like.

To monitor potentially suspicious activities, some embodiments of the present invention include electronically accessible records relating to money transfers. These records are searched according to specified criteria to determine if any transactions are potentially suspect. If so, these records are flagged and may be separately stored for further evaluation. For example, in the money transfer world, certain dollar value transactions need to be reported to the U.S. Government. The historical records may be searched for dollar ranges just below this limit to determine if multiple transactions are made by the same person or received by the same person within a specified time in order to avoid being reported to the U.S. Government.

Various criteria can be defined to evaluate a money transfer system in accordance with the present invention including certain transfer amount limits, transactions between particular known entities, transactions associated with messages that are to be translated to particular languages, and/or transactions where the value converted to a particular form, such as, a particular foreign currency.

The systems and methods of the present invention are capable of looking at both sides of a transaction, or only the sender or receiver side. Other embodiments provide for checking a combination of transactions to detect suspicious behavior. In some embodiments, elements of the list can be purged based on either time, known information, or a combination thereof. Further, elements of the list can be locked such that they are not susceptible to any purging processes.

As with the monitoring system disclosed in the previously incorporated U.S. patent application Ser. No. 10/091,000, entitled "Money Transfer Evaluation Systems & Methods", the systems and methods of the present invention can be tailored to a particular money transfer system such that the overall impact of any monitoring on the transfer system is reduced. Thus, for example, such systems and methods can run either in real time or in a batched mode during off-peak time for the evaluated money transfer system. In some embodiments of the present invention, an intelligent, iterative approach is applied to identify factors related to suspicious behavior. Such an approach can avoid a static situation that, when known to criminal elements, is easily avoided.

The present invention provides and/or utilizes various equipment and techniques in relation to evaluating money transfers. The present invention permits some form of value, such as cash, to be received and then electronically transferred to another location where it is available for pickup or further processing in the same or an alternate form. In some embodiments, a money transfer mechanism is utilized to effectuate and/or evaluate a money transfer. FIG. 1 illustrates an exemplary money transfer system 100. While FIG. 1 illustrates an exemplary money transfer mechanism, one of ordinary skill in the art will recognize other money transfer mechanisms to which the present invention may be applied or used in conjunction with.

Referring to FIG. 1, money transfer system 100 is comprised of an interface system 125, an automatic teller system ("ATM") system 145, a deposit maintenance network 150, a credit maintenance network 160 and a central exchange 170. Interface system 125 is communicably coupled to ATM system 145 via an ATM network 140, deposit maintenance network 150 and credit maintenance network 160. In general, interface system 125 unifies a variety of transfer systems while supporting a variety of mechanisms for introducing and receiving information to and/or from money transfer system 100.

Interface system 125 comprises a transaction center 130 and one or more terminals 110 in communication via a transaction network 120. Transaction network 120 can be any communication network capable of transmitting and receiving information in relation to a transfer of value from one entity to another. For example, transaction network 120 can comprise a TCP/IP compliant virtual private network (VPN), the Internet, a local area network (LAN), a wide area network (WAN), a telephone network, a cellular telephone network, an optical network, a wireless network, or any other similar communication network. In particular embodiments, transaction network 120 provides message based communications between terminals 110 and transaction center 130.

Terminals 110 can be any terminal or location where value is accepted and/or provided in relation to money transfers across money transfer system 100. Thus, in some instances, terminal 110 is a convenience store where a clerk can receive value from a sender and initiate transfer of the value to a receiver via money transfer system 100. In such cases, the clerk can typically also provide transferred value to a receiver.

In other instances, terminal 110 is an automated system for receiving value from a sender for transfer via money transfer system 100 and/or for providing value to a receiver that was transferred via money transfer system 100. To accommodate various different payment instruments and types, terminal 110 can include a variety of interfaces. For example, terminal 110 can include a mechanism for receiving cash, credit cards, checks, debit cards, stored value cards and smart cards. Such terminals may also be used at the payout end to print a check or money order, or to credit a cash card or stored value card. Examples of such terminals are described in copending U.S. application Ser. No. 09/634,901, entitled "Point Of Sale Payment System," filed Aug. 9, 2000 by Randy J. Templeton et al., which is a nonprovisional of U.S. Prov. Appl. No. 60/147,899, entitled "Integrated Point Of Sale Device," filed Aug. 9, 1999 by Randy Templeton et al, the complete disclosures of which are herein incorporated by reference for all purposes.

In yet other instances, terminal 110 is a personal computer operated by a sender of value. Such a terminal can be communicably coupled to transaction center 130 via the Internet. The terminal can further include a web browser capable of receiving commands for effectuating transfer of value via money transfer system 100.

Terminal identification information can be associated with each terminal 110. Such identification information includes, but is not limited to, a physical location, a telephone number, an agent identification number, a terminal identification number, a security alert status, an indication of the type of terminal, a serial number of a CPU, an IP address, the name of a clerk, and the like.

Using money transfer system 100, value can be transferred from any of a number of points. For example, value can be transferred from terminal 110 to itself or any other terminal 110, from any terminal 110 to a deposit account via deposit maintenance network 150 or credit maintenance network 160, from any terminal 110 to any ATM 114 via ATM network 140. Many other transfers to/from ATMs 114, deposit accounts, terminals, and/or credit accounts can be accomplished using money transfer system 100.

Figure 2:
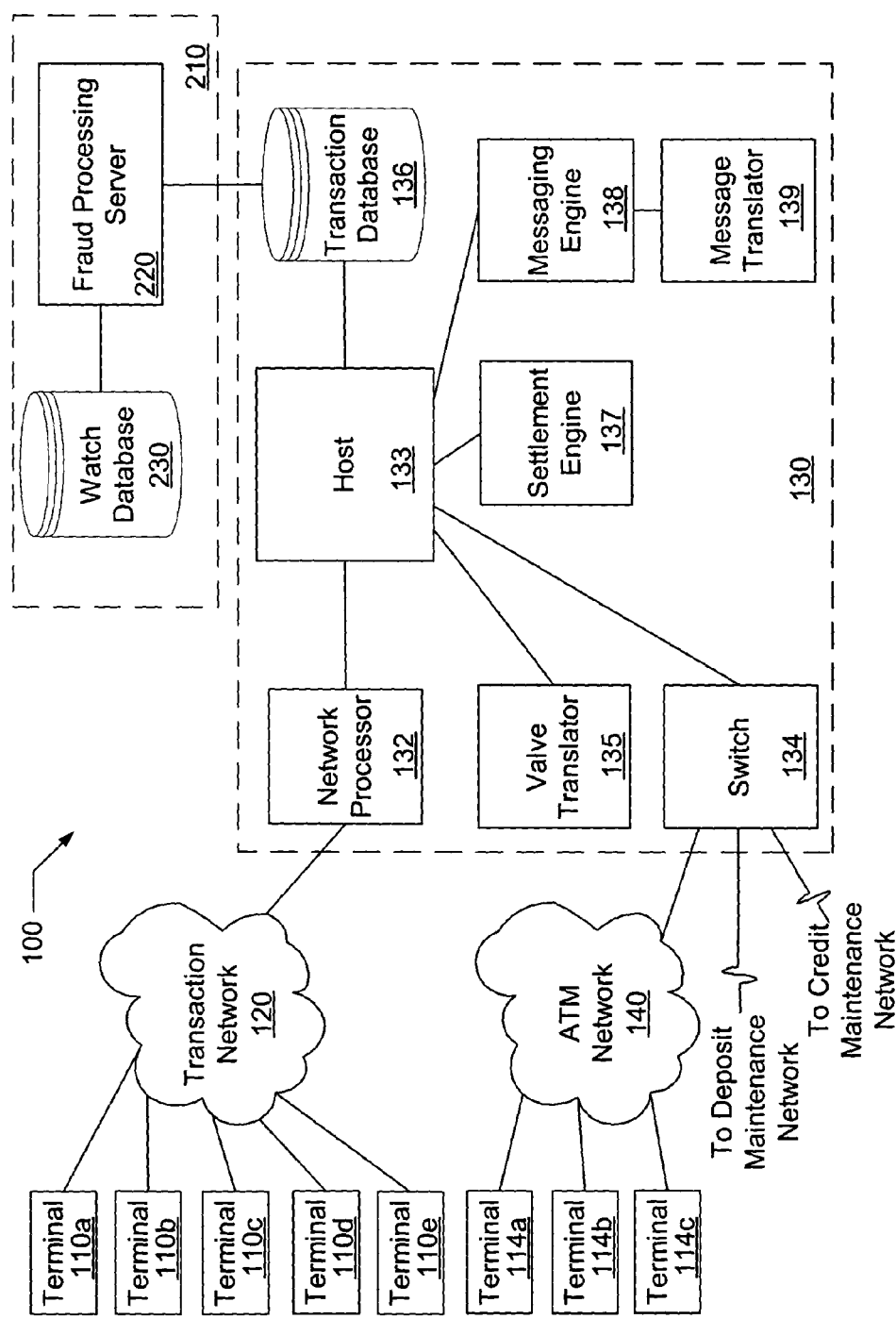
FIG. 2 illustrates a fraud watch system associated with the money transfer system of FIG. 1 in accordance with an embodiment of the present invention.

Referring to FIG. 2, in accordance with some embodiments of the present invention, a fraud watch system 210 is provided in communication with transaction center 130 of money transfer system 100. As illustrated, transaction center 130 includes a network processor 132 to process data received and transmitted via transaction network 120. Data to/from network processor 132 is available to a host 133 that may communicate with one or more of a value translator 135, a transaction database 136, a settlement engine 137 and a messaging engine 138 to perform functions associated with transferring value via money transfer system 100. In turn, messaging engine may communicate with a message translator 139. The received and/or provided by transaction center 130 may include information on the sender, information on the recipient, identification information associated with a terminal 110, the type and amount of value transferred, a desired location to transfer the value, and the like. In some cases, a value translator 135 may be used to change the type of value. For example, value translator 135 may do a foreign currency conversion, or may transfer from one type of value to another, e.g. frequent flyer miles to United States' Dollars. All information that is processed may conveniently be stored in transaction database 136. In some cases, transaction database 136 comprises both real time transaction information and on-demand transaction information on the same physical hardware. In other cases, one-demand transaction information is maintained on separate hardware from real time transaction information. In yet other cases, transaction database 136 is actually two distinct databases—one for maintaining real time transaction information and the other for maintaining on-demand transaction information.

Settlement engine 137 may be used to facilitate the crediting and debiting of various accounts during a transfer. For example, if a sender requests that funds from a credit card account be used in the transfer, settlement engine 137 is used to contact credit maintenance network 160 to charge the card and to manage the fees involved in the transaction. Such fees may be those charged by the credit organization as well as internal fees that are a part of the money transfer transaction. Settlement engine 137 may be used in a similar manner when crediting or debiting checking accounts, stored value accounts, customer loyalty points and the like.

In some cases, the sender may also wish to send a message with the value. Such a message may be a simple greeting, business or legal terms, and the like. Messaging engine 138 is employed to convert the message to the proper format depending on the type of output device that is to be used with receiving the money. For example, the output device may be a printer that physically prints the message onto some type of media. Alternatively, the message may be temporarily displayed on a display screen, such as on a kiosk, ATM machine, point of sale device, an e-mail, a web page or the like. The sender or recipient may also indicate that the message needs to be translated to a different language. In such cases, message translator 139 may be used to translate the message into the other language. This may be accomplished by simply doing a word look up for each corresponding word in the other language. More complex language translation capabilities may also be used.

Once a value transfer is properly processed, data indicating the transfer is sent by a switch 134 to the appropriate network as shown. This may be to ATM network 140, deposit maintenance network 150 and/or credit maintenance network 160 to complete the transaction.

Fraud watch system 210 includes a fraud processing server 220 and a watch database 230. Fraud watch system 210 is associated with transaction system 130 in a manner that allows for access to transaction database 136. Such association can be provided by direct wired communication between transaction database 136 and fraud processing server 220, by direct or network communication between transaction center 130 and fraud processing server 220, or by any other mechanism that provides fraud watch system 210 with access to transaction database 136. In one particular embodiment, fraud processing server 220 is communicably coupled to transaction network 120 and accesses transaction database 136 via network processor 132 and host 133. In another embodiment, fraud processing server 220 is directly coupled to host 133 and accesses transaction database 136 via host 133. It will be recognized by one of ordinary skill in the art that a number of other mechanisms exist within the scope of the present invention for providing access by fraud processing server 220 to transaction database 136.

Fraud processing server 220 can be any microprocessor based device capable of retrieving data from transaction database 136, searching and manipulating the data, maintaining a form of the data on watch database 230, and providing access to data on database 230. Such access to the data can include formatting the data and providing the data in an easily accessible form. In some embodiments, fraud processing computer is a single computer, such as a personal computer or a database server. In other embodiments, fraud processing server is a group of two or more computers. In such embodiments, fraud processing computer can include a central computer associated with one or more peripheral computers. Such peripheral computers can be personal computers or portable devices, such as lap top computers and/or personal digital assistants. In a particular embodiment, fraud processing server 220 includes a SQL server, while in other embodiments, it includes an ORACLE server.

Fraud processing server 220 includes a computer readable medium capable of maintaining instructions executable to perform the functions associated with fraud processing server 220. The computer readable medium can be any device or system capable of maintaining data in a form accessible to fraud processing computer 220. For example, the computer readable medium can be a hard disk drive either integral to fraud processing server 220 or external to the server. Alternatively, the computer readable medium can be a floppy disk or a CD-ROM apart from fraud processing server 220 and accessible by inserting into a drive (not shown) of fraud processing server 220. In yet other alternatives, the computer readable medium can be a RAM integral to fraud processing server 220 and/or a microprocessor (not shown) within the server. One of ordinary skill in the art will recognize many other possibilities for implementing the computer readable medium. For example, the computer readable medium can be a combination of the aforementioned alternatives, such as, a combination of a CD-ROM, a hard disk drive and RAM.

Turning now to FIGS. 3a through 3d, a flow diagram 300 illustrates a method in accordance with the present invention for monitoring a variety of value transfers. Following flow diagram 300 of FIG. 3a, real time transaction data is received from one or more transaction points (block 301). In addition, various transactions meeting certain thresholds are the subject of additional data gathering. This additional data can be obtained through a periodic request, and thus is referred to as on-demand transaction information. As just some examples, where a transfer exceeds a one thousand dollar threshold, a sender may be asked for a social security number, a driver's license number, a passport number, a date of birth, and/or the like. This data may not be gathered in other situations where the transfer does not exceed the threshold, and the data may not be included in the real time data. In some cases, the real time transaction information and on-demand transaction information is transferred from transaction database 136 (and/or another database) to fraud processing server 220. The on-demand transaction information is received (block 302), matched to correlated real time transaction information, stripped of irrelevant fields, and assembled as transaction packages (block 303). In some cases, the on-demand information is requested and received every thirty days, and thus the real time data is maintained for thirty days. Upon receiving the on-demand data, the transaction packages can then be assembled. In some cases, real time data that is not associated with on-demand data is deleted and not assembled as transaction packages. In other cases, real time data that is not associated with on-demand data is assembled as transaction packages.

Figure 3A:
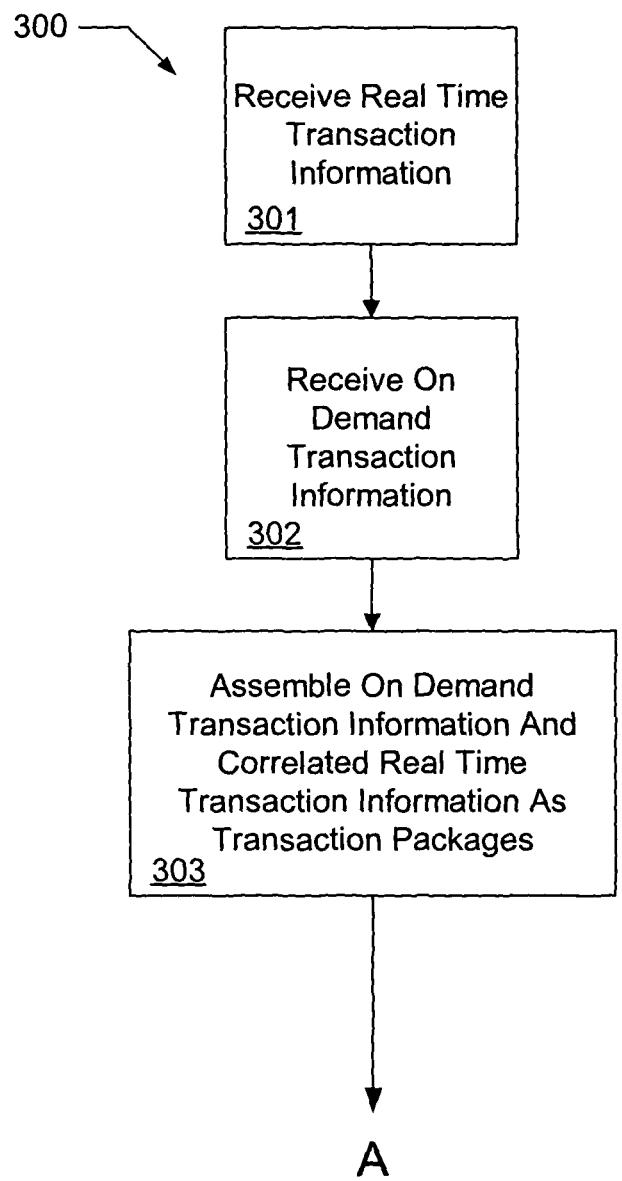
FIGS. 3a-3d are flow diagrams illustrating a method in accordance with embodiments of the present invention.
Figure 3B:
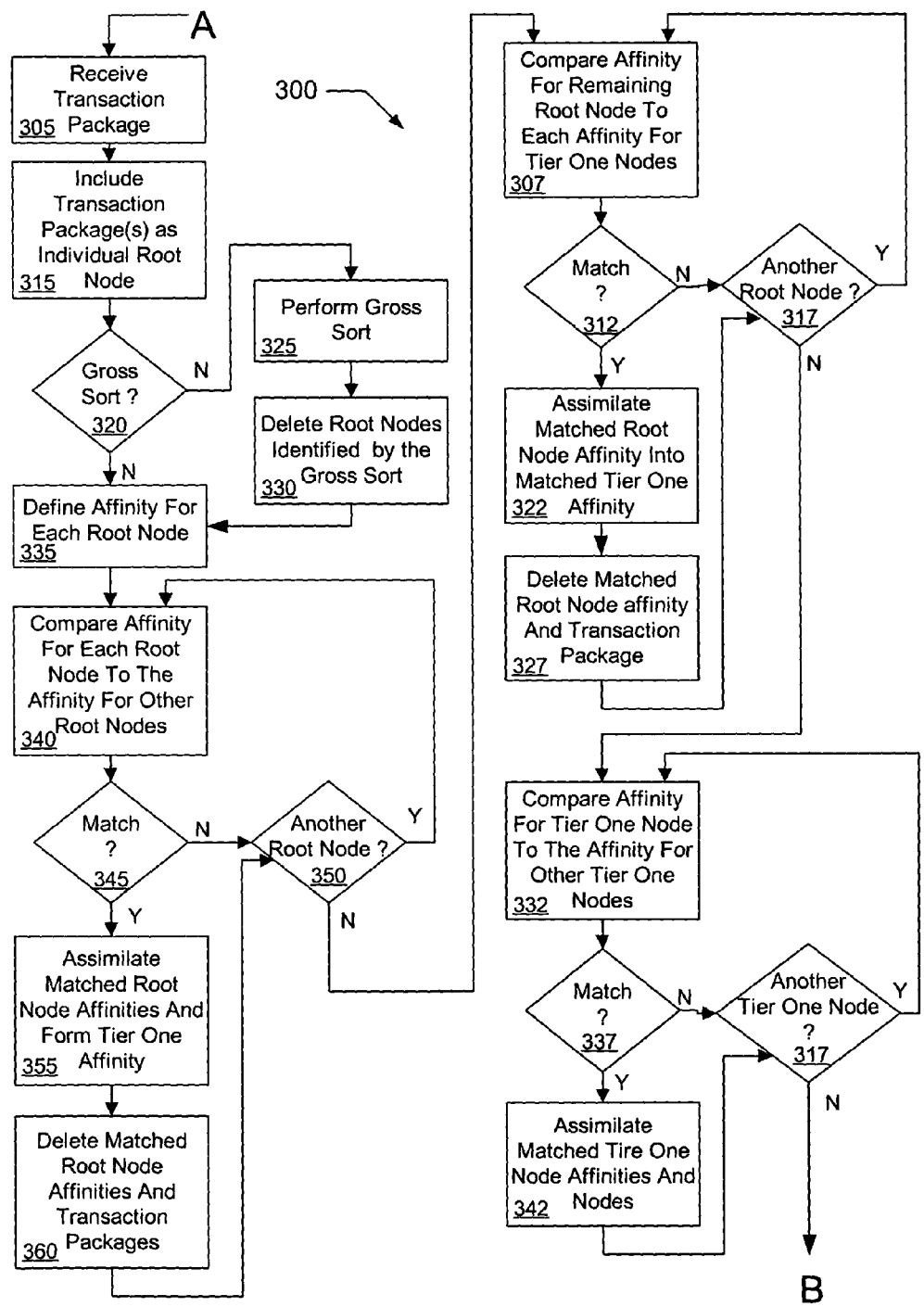

Turning to FIG. 3b, the transaction packages can be transferred to a root database (block 305). A transaction package is an electronic file including a set of information detailing a transaction that has been performed in relation to a value transfer system. As just one example, a transaction package can include the names of both the sender and recipient in the transaction, as well as identification and contact information for the sender and recipient, identification of agents involved in the transfer, the amount of the transfer, the type of value transferred, a transaction cost, and the like. Each of the transaction packages are assigned as an individual root node of the fraud monitoring system (block 315). In some cases, this includes assignment by fraud processing server 220 as a root node within fraud watch system 210.

It is next determined if a gross sort of the existing root nodes is to be performed (block 320). Where a gross sort is to be performed (block 320), the gross sort is performed (block 325) and the root nodes identified from the performed gross sort are deleted (block 330). A gross sort can be any preliminary sort directed at eliminating root nodes that are associated with transaction packages that for some reason are not thought to be suspicious. Thus, for example, a gross sort may be performed to identify all root nodes where the associated transaction was for less than five hundred U.S. Dollars. Upon identifying the root nodes with transactions less than five hundred dollars, those root nodes are deleted from fraud watch system 210. Based on the disclosure provided herein, one of ordinary skill in the art will appreciate a number of gross sorts that can be preformed in accordance with the present invention.

Either where no gross sort is to be performed (block 320), or where the gross sort has been completed (blocks 325, 330), an affinity is created for each remaining root node (block 335). As used herein, a root node affinity can be any collection of data points that includes one or more data points derived or selected from the root node transaction package to which the affinity is associated. Thus, as just one example, a root node transaction package may include the name of the sender, the name of the recipient, and the number of the transfer agent. In such a case, the root node affinity associated with the root node may include a combination of the sender name and the number of the transfer agent. Based on the disclosure provided herein, one of ordinary skill in the art will recognize a number of different data elements and combinations thereof that can form a root node affinity. Further, in some cases, affinities can be combined in which case, the resulting tier one or tier two affinity is a collection of data points from each of the combined affinities. Further, defining an affinity can include standardizing one or more data points from a given transaction package. As just one example, this can include converting a transferred value to a common value, such as from Mexican Pesos to US Dollars.

Each affinity associated with a root node is compared to other affinities within the root node (block 340). This process can continue until all of the root node affinities have been compared one with another (block 350). Where a match between root node affinities is detected (block 345), the matching root node affinities are assimilated with a combined affinity that is maintained as a tier one affinity (block 355). As used herein, a tier one affinity is an affinity that is formed by assimilating two or more (tier one and/or root node) affinities into a single affinity. A match can be determined in a number of ways. For example, in one embodiment, a match occurs where three or more data points match across two affinities. Thus, for example, where the sender name and the receiver name match in two affinities, the sender locations match across two affinities, and the phone number matches across two affinities, an affinity match will be found. Alternatively, in other embodiments, a match occurs where a single data point matches across two affinities. Thus, for example, where the telephone number for a recipient in one affinity matches the telephone number for a recipient in another affinity, an affinity match may be found. In one particular embodiment, a match is only found where two or more data points within the affinities match. Thus, for example, an a match would not be found where only an exact name match was found, however, a match would be found where a phonetic name match was found in addition to a match in the area code associated with a telephone number in two affinities. In some cases, a match may include an exact match of one data point, and a partial match of another data point. Based on the disclosure provided herein, one of ordinary skill in the art will recognize a number of basis upon which an affinity match may be defined to occur. In particular embodiments of the present invention, a user interface is provided that allows a user to define the basis upon which a match will be considered to occur. Once the matching affinities are assimilated with a common affinity, the root node affinities that were the subject of the match are removed as individual affinities (block 360). Again, this process is continued until all of the root node affinities have been considered (block 350).

The remaining root node affinities are compared to each of the tier one affinities (block 307). This process continues until all of the remaining root node affinities have been compared with the tier one affinities (block 317). Where a match of a root node affinity is found with a tier one affinity (block 312), the root node affinity is assimilated with the tier one affinity (block 322) and the matched root node affinity is deleted from the root node (block 327). As with the previously discussed match process, a number of basis can be considered to determine whether a match has occurred. Further, a user interface can be provided that allows a user to define the basis that result in a match.

Next, each of the tier one affinities are compared one with another (block 332). This process continues until all tier one affinities have been considered (block 347). Where a match is found between tier one affinities (block 337), the matching affinities are assimilated with a common tier one affinity, and the matched affinities are removed from the system (block 342). Again, as with the previously discussed match process, a number of basis can be considered to determine whether a match has occurred. Further, a user interface can be provided that allows a user to define the basis that result in a match.

Figure 3C:
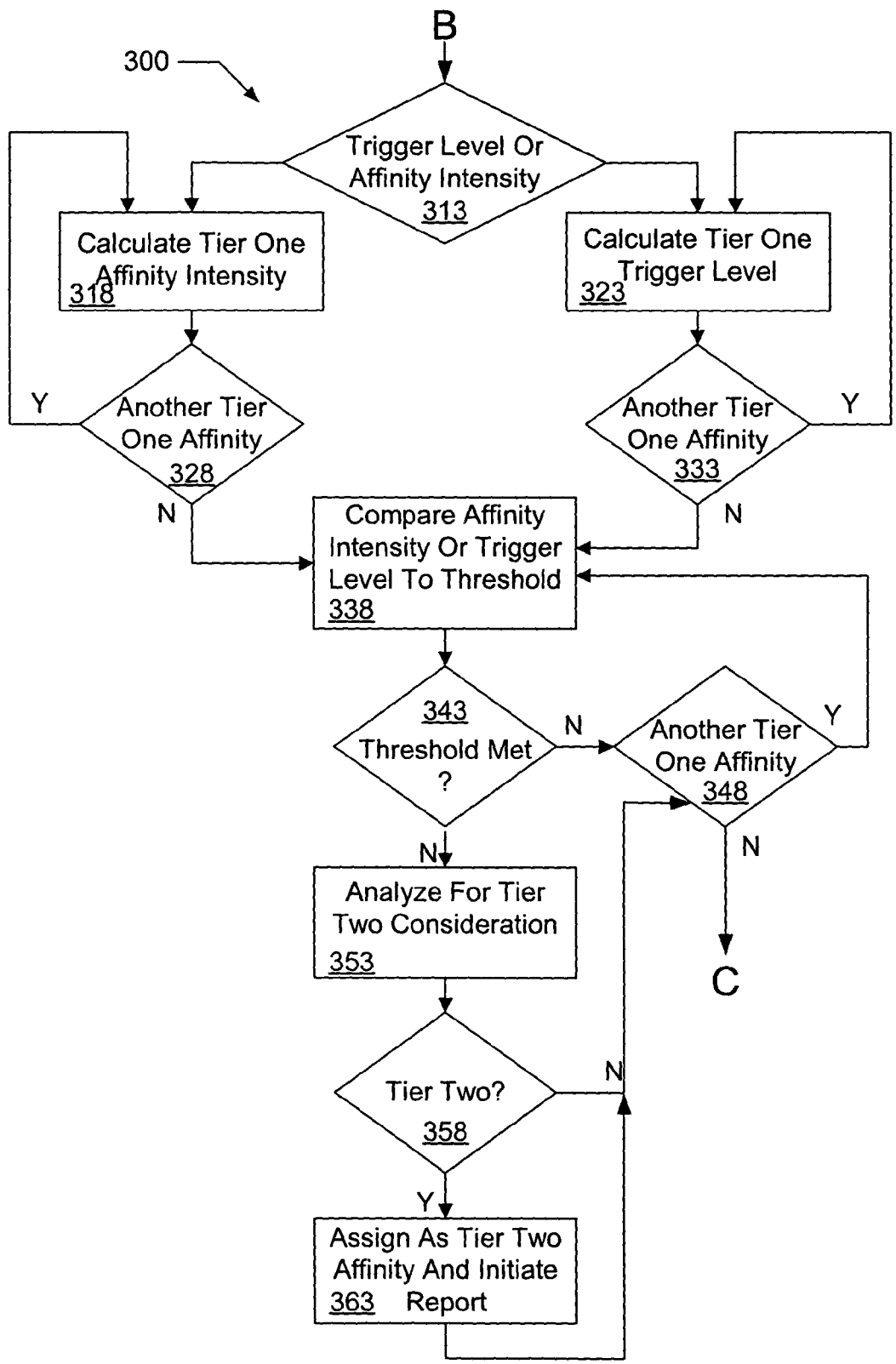

Turning to FIG. 3c, it is determined whether a an event trigger level or an affinity intensity trigger level is to be used to identify reporting (block 313). Where an affinity intensity is to be used (block 313), an affinity intensity for the tier one affinities is calculated (block 318). As used herein, affinity intensity can be one or more numbers indicating the likelihood of suspicious behavior associated with a given affinity. As just one example, an affinity intensity can be the total amount transferred in all transactions represented by the affinity multiplied by the number of matches found in the individual affinity data points. Thus, for example, where the total amount transferred is twenty-thousand, and the sender's name matches three times within the affinity (total of three), the telephone number matches twice (total of two), the recipient's name matches twice (total of two), and there is one match to the combination of recipients name and agent number (total of one). The affinity intensity may then be calculated to be twenty-thousand multiplied by eight (the total number of matched points). In some cases, different matches may be weighted differently in determining an affinity intensity. For example, a match of recipient's names combined with agent identifications may be weighted by three hundred percent, a match of phone numbers weighted by two hundred percent, and a match of recipient's names or sender's names weighted by one hundred percent, and a match of a sender's name to a recipient's name weighted by seventy percent. These weightings can be multiplied by the respective matches to derive a score, or affinity intensity as previously described. This affinity calculation process is repeated until an affinity intensity is calculated for each of the tier one affinities (block 328).

Alternatively, where an event trigger level is to be used (block 313), a trigger level is calculated for each of the tier one affinities (blocks 323, 333). Such trigger levels can be calculated based on a number of different occurrences that are detected in relation to the respective tier one affinities. For example, the trigger level can indicate: the number of transactions that are associated with the tier one affinity, the maximum amount transferred in relation to any individual within the affinity, an amount transferred in relation to an individual within the affinity within a given length of time, the maximum number of transactions associated with any individual within the affinity, the total amount of all transactions represented by the affinity, or a combination of the aforementioned. Based on the disclosure provided herein, one of ordinary skill in the art will appreciate a myriad of trigger levels that can be calculated.

The calculated affinity intensities or event trigger levels are then compared to threshold levels (block 338). These threshold levels can be defined by a user via a user interface. As just one example, a trigger threshold may be set where an individual sends or receives transactions all of which are less than ten thousand dollars individually, but which aggregate to an amount that equals or exceeds fifteen thousand dollars. Such a trigger threshold may be limited to a particular window of time such as, for example, thirty days. Another example may be where an individual sends or receives transactions all of which are less than ten thousand dollars individually, but which aggregate to an amount that equals or exceeds ten thousand dollars in a seven day period. As yet another example, a trigger threshold may be set where an individual sends or receives more than five transactions in a thirty day period. Yet another example may be set where an individual is involved in two or more transactions between two thousand four hundred dollars and two thousand nine hundred ninety nine dollars, or some other defined limit. Yet another trigger threshold may be set where an individual sends or receives a single transaction of between two thousand nine hundred and ninety dollars and two thousand nine hundred and ninety nine dollars, or some other determined range. Based on the disclosure provided herein, one of ordinary skill in the art will recognize a number of trigger thresholds that can be set. Affinity thresholds can be set where an affinity intensity exceeds a predetermined level such as, for example, fifty thousand.

This comparison process is repeated for each of the tier one affinities (block 348). Where a threshold is met (block 343), the tier one affinity is forwarded to a human operator for consideration of any suspicious activity indicated via the tier one affinity (block 353). Where the human operator identifies suspicious behavior associated with the affinity (block 358), the tier one affinity can be assigned tier two status and a suspicious behavior report automatically generated and provided to the government (block 363). In some cases, the human operator processes (blocks 353, 358) are not performed, but rather the tier one affinity is automatically assigned tier two status and a suspicious behavior report generated and provided to the government (block 363) based on exceeding the defined event or affinity trigger level. Tier two affinities can be locked into the system such that they are not aged out of the system as discussed below.

Figure 3D:
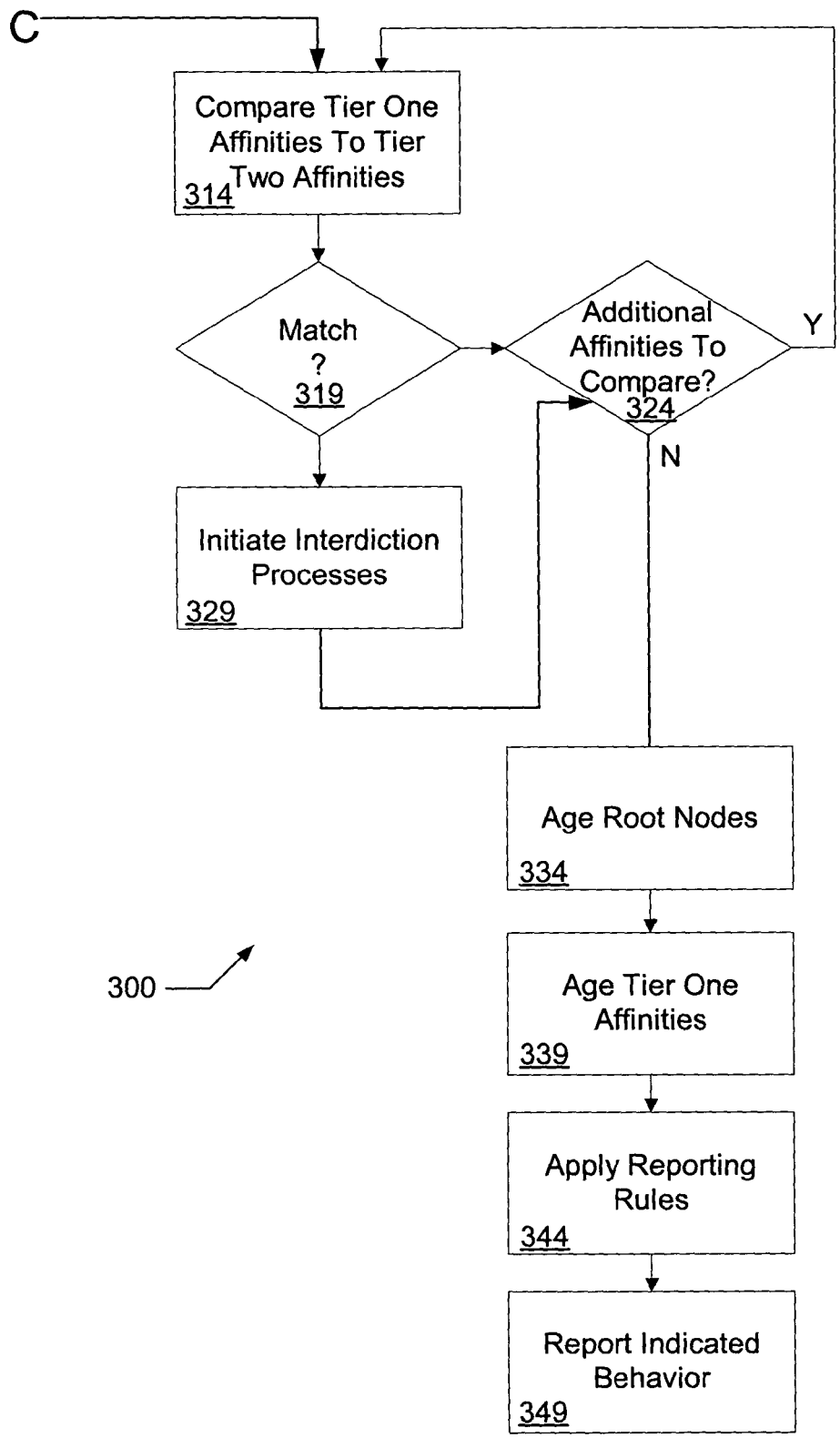

Turning now to FIG. 3d, each of the tier one affinities and remaining root node affinities are compared to tier two affinities (block 314). This process can continue for all of the affinities (block 324). Where a match occurs (block 319), an interdiction process can be initiated to preclude individuals identified in the tier two affinity from using the monitored value transfer system (block 329). In addition, the matched affinity can be assimilated with the tier two affinity. In some cases, multiple matches to a tier two affinity are recorded before an interdiction process is initiated. Further, where a match occurs, the matching tier one affinity or root node affinity can be assimilated with the tier tow affinity.

In addition, each of the remaining root node affinities can be aged (block 334). This aging process can result in the removal of a root node affinity from the system after a set period of time, such as thirty days, where it is not first matched to form a tier one affinity. In addition, each of the tier one affinities can be aged (block 339). Thus, tier one affinities that become inactive for an extended period such as ninety days from the last transaction represented in the affinity, can be removed from the system.

Periodically, reporting rules can be applied (block 344), and reports generated to the government (block 349). These reports can indicate additional activity flagged in relation to a tier two affinity. Thus, rather than reporting each occurrence of activity in relation to a tier two affinity, a single report can be generated indicating all suspicious behavior in relation to the tier two affinity. This provides an efficient means for investigating suspicious behavior, while avoiding the appearance of rampant illicit behavior as would be suggested through generation of a report for each flagged transaction.

Figure 4:
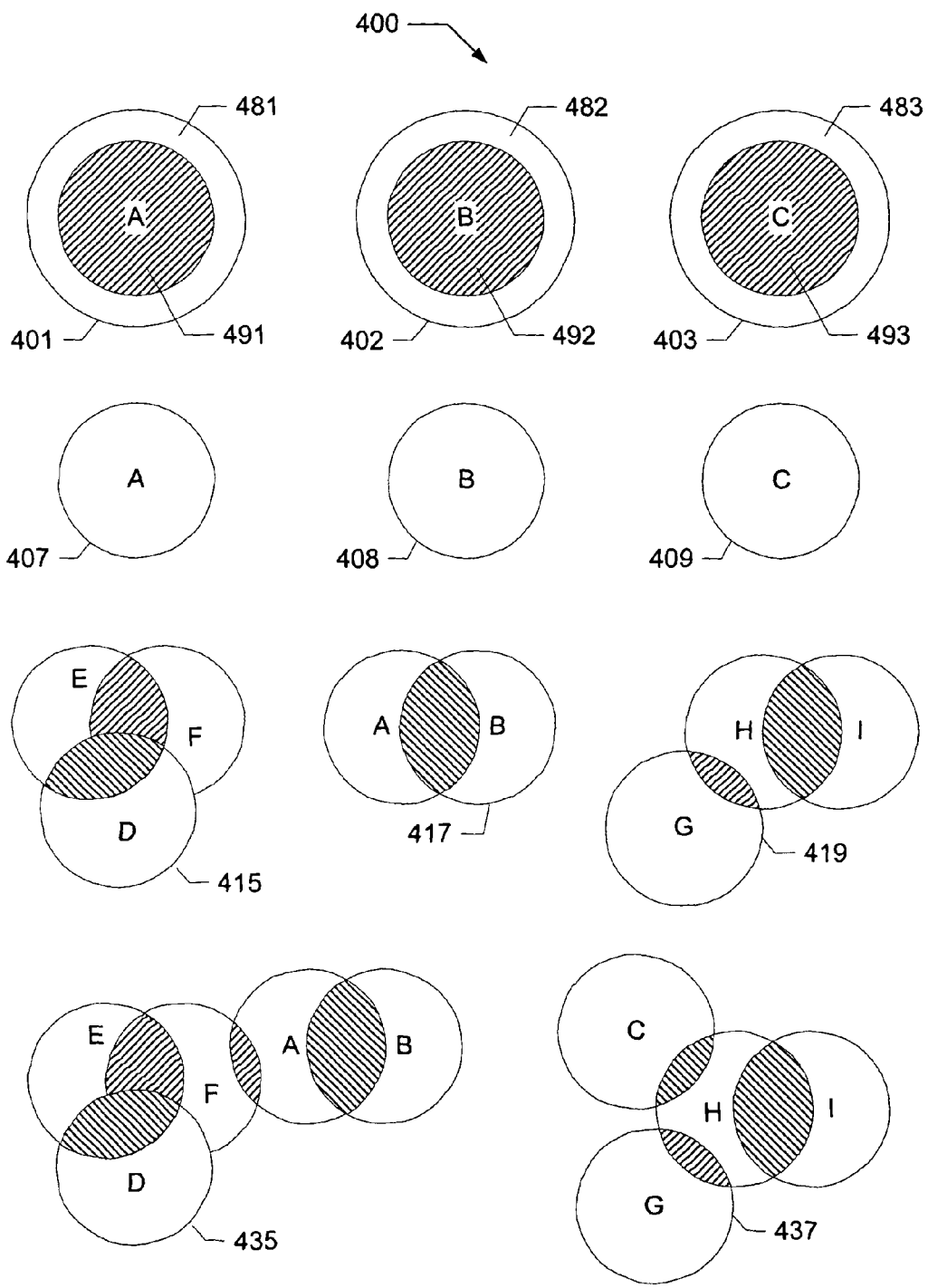
FIG. 4 is a graphic depiction of affinity formation and graduation as described in relation to the flow diagram of FIG. 3.

Turning to FIG. 4, a graphical representation 400 of the affinity progression described in relation to FIG. 3 is provided. Elements 401, 402, 403 respectively represent transaction packages A, B, C formed by combining on-demand information and related real time information as previously described, or including only real time information where no on-demand information is available. The outer dark rings 481, 482, 483 represent ancillary transaction information that is not used in any monitoring. This ancillary information can include, for example, transaction costs and is generally discarded. The cross-hatched inner areas 491, 492, 493 represent transaction information that is used in relation to the monitoring processes.

As depicted, the ancillary information 481, 482, 483 is stripped from the respective transaction packages 401, 402, 403, and the usable transaction information 491, 492, 493 is formed into respective root node affinities 407, 408, 409. These root node affinities 407, 408, 409 are then compared one to the other to determine if any matches exist. Where a match occurs, the matching root node affinities are assimilated with a tier one affinity. Such a match is depicted as tier one affinity 417 which is formed based on a match between root node affinities 407, 408. Then, the remaining root node affinity 409 is compared against the previously formed tier one affinities 415, 419. Where a match is detected, the remaining root node affinity is assimilated with the matching tier one affinity. Such a match between root node affinity 409 and tier one affinity 419 is depicted as tier one affinity 437. Then, each tier one affinity 415, 417, 437 is compared against each other. Where a match is detected, the matching tier one affinities are assimilated to form a common tier one affinity. Such a match between tier one affinity 415 and tier one affinity 417 is depicted as tier one affinity 435.

Turning now to FIGS. 5 through 12, an exemplary data set is used to illustrate the creation and progression of affinities. FIG. 5 depicts a set of transaction packages 501, 502, 503, 504 formed from either real time information or a combination of real time and on-demand information. Each transaction package includes a number of data points. For example, a variety of data points 511-528 can be provided in relation to the sender of the transaction, a variety of data points 541-550 can be provided in relation to the receiver of the transaction, and one or more general data points 530 can be provided to describe the transaction. The sender data points can include, but are not limited to, the sender's last name 511, the sender's middle name 512, the sender's first name 513, the sender's phone number 514, the sender's address 515, the sender's agent used to perform the transaction 517, the type of agent 516, the date sent 518, the amount of value to be sent 519, the type of value to be sent 520, an account type used to provide the sent value 521, an account number associated with the account type 522, the sender's social security or other identification number 523, the sender's date of birth 524, the sender's identification type 525, the issuer of the sender's identification 526, the location of the issuer of the sender's identification, and the identification number from the sender's identification. The recipient's data points can include, but are not limited to, the recipient's last name 541, the recipient's middle name 542, the recipient's first name 543, the recipient's phone number 544, the recipient's address 545, the recipient's agent used to perform the transaction 547, the type of agent 546, the date received 548, the amount of value received 549, and the type of value received 550. The general data points can include information about the transaction including, for example, transaction costs 530.

Turning to FIG. 6 the process of gross sorting is depicted where transaction package 502 is eliminated from consideration. As previously discussed, a gross sort can eliminate data that is unlikely to represent suspicious behavior, or is of such a low value that it is not desirable to use the data for monitoring purposes. Thus, for example, the transaction package may be eliminated where the transaction value is below a set threshold. The two hundred dollar transaction of transaction package 502 may have been below a cutoff threshold, and thus transaction package 502 is removed from consideration. Further, transaction package 502 may have been eliminated from consideration because it lacked on-demand information in the form of a sender's date of birth and social security number.

After the gross sort is performed, the remaining transaction package information is used to form root node affinities as depicted in FIG. 7. The root node affinities 701, 703, 704 can be comprised of a subset of data points from respective transaction packages 501, 503, 504, can be comprised of data points derived from respective transaction packages 501, 503, 504, or can be comprised of a combination thereof. The depicted exemplary root node affinities are comprised of a combination of data points directly from and others derived from respective transaction packages.

As depicted, root node affinities 701, 703, 704 include a last and first name data point 711. This data point is a combination of the last name 511 and first name 513 data points from the respective transaction packages. Further, data point 711 is expanded to include a number of aliases known to be used in relation to the first name. This can be done using alias determination software as is known in the art. Thus, as an example, root node affinity 701 includes three last name/first name data points 711 representing three different variations of the name "Samuel". In addition, the last name/first name combination is reformed into a phonetic spelling with a truncated first name making matching the name less susceptible to misses where the name is misspelled, or spelled in different ways. This phonetic spelling is maintained as data point 712.

This phonetic spelling can be obtained using techniques known to those of skill in the art such as, for example, using phonetic generation software. In addition, affinities 701, 703, 704 include a combination of last name, first name, and agent identification maintained as data point 713. Where a match is found for this combination a strong affinity is indicated, and such a match can be used to create an increased affinity intensity as previously described. Similar data points 714, 715, 716 are formed using the recipient's information.

In addition, affinities 701, 703, 704 include the sender's phone number 514 and the recipient's phone number 544 selected directly from respective transaction packages 501, 503, 504. Further, the address information from transaction packages 501, 503, 504 can be used to generalize the sender's and recipient's location. This can be generalized to, for example, a region, city, state, country, zip code, or the like. This generalized location is maintained as data points 717, 718 in the respective affinities 701, 703, 704. Also, the senders account number 522 and date of birth 524, where available, are included in the respective affinities. A combination of the ID type, issuer and number is also included as data point 719. The amount transferred is converted to a common value and maintained as data point 720. This common value can be the transferred value converted to a common currency type such as U.S. Dollars. Thus, for example, where the transferred value is in Brazilian Reales, the amount it converted to U.S. Dollars using recent conversion tables, and the converted amount is maintained as common value 720.

As previously discussed in relation to FIG. 4, root node affinity A 703 and root node affinity B 704 include a match, and are thus assimilated with a common tier one affinity 800 depicted in FIG. 8. As depicted, a number of matches occur. These matches include a match of the sender's name, and the agent identification used by the sender. Created tier one affinity 800 thus includes all data points included in the underlying root node affinities 703, 704. Each of these data points can then be compared with other root node affinities, tier one affinities, and tier two affinities to determine matches. The larger an affinity grows, the more likely is it to be involved in matches because of the increase in data points maintained in the affinity.

FIGS. 9 and 10 depict previously formed tier one affinities 900 and 1000, respectively. Tier one affinity 900 matches tier one affinity 800, and the two are assimilated to form a new tier one affinity 1100 as depicted in FIG. 11. The match can be for example, the name and location of the recipient (Benjamin Thomas) of data set 704 matches that of the sender of data set 910. Similarly, the root node affinity 701 matches the previously formed tier one affinity 1000, and the two are assimilated to form a new tier one affinity 1200 as depicted in FIG. 12. As depicted, the match that caused the formation of tier one affinity 1200 is the common recipient (Leonard Jackson) and common agent number.

The invention has now been described in detail for purposes of clarity and understanding. However, it will be appreciated that certain changes and modifications may be practiced within the scope of the appended claims. For example, other criteria may be used for identifying relationships between reference designators and money transfer records. Additionally, other criteria may be used for analyzing a money transfer database using the reference designators. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for progressive value transfer evaluation, the method comprising:
   receiving, by a computer system, a first transaction package comprising a plurality of first transaction data points;
   forming, by the computer system, a first root node affinity associated with the first transaction package, the first root node affinity comprising a first text string representing at least one of the plurality of first transaction data points as one of a set of predefined root transaction data types;
   comparing, by the computer system, the first root node affinity with a tier one affinity, the tier one affinity comprising a second text string representing an assimilation of a second root node affinity with at least one of a plurality of second transaction data points, the plurality of second transaction data points being received as at least a portion of a second transaction;
   assimilating, by the computer system, the first root node affinity with the tier one affinity into a third text string based at least in part on the comparison;
   converting, by the computer system, the tier one affinity to a tier two affinity based at least in part on the comparison with the root node affinity, the tier two affinity comprising the third text string; and
   generating, by the computer system, a report associated with the tier two affinity.

2. The method of claim 1, wherein the comparison between the tier one affinity and the root node affinity satisfies a trigger level, and wherein the converting the tier one affinity to a tier two affinity is based at least in part on satisfying the trigger level.

3. The system of claim 2, wherein the trigger level is selected from a group consisting of: an affinity intensity, an event count, and an event occurrence.

4. The method of claim 1, wherein the tier one affinity is a first tier one affinity, the method further comprising:
   forming a second tier one affinity;
   comparing the second tier one affinity with the tier two affinity; and
   based at least in part on the comparison, initiating interdiction procedures in relation to the tier two affinity.

5. The method of claim 1, wherein the tier one affinity is a first tier one affinity, the method further comprising:
   forming a second tier one affinity;
   comparing the second tier one affinity with the tier two affinity; and
   based at least in part on the comparison, generating a report indicating a result related to the comparison of the second tier one affinity with the tier two affinity at a defined period.

6. The method of claim 5, wherein the transaction package is a first transaction package, and wherein forming the second tier one affinity comprises:
   receiving a second transaction package and a third transaction package;
   forming a second root node affinity associated with the second transaction package;
   forming a third root node affinity associated with the third transaction package;
   comparing the second root node affinity with the third root node affinity.

7. The method of claim 1, wherein the transaction package is a first transaction package, and wherein the root node affinity is a first root node affinity; the method further comprising:
   receiving a second transaction package;
   forming a second root node affinity associated with the second transaction package;
   comparing the second root node affinity with the tier two affinity;
   based at least in part on the comparison, performing a function selected from a group consisting of:
      generating a report indicating a result related to the comparison of the second root node affinity with the tier two affinity at a defined period; and
      initiating interdiction procedures in relation to the tier two affinity.

8. The method of claim 1, wherein the transaction package is a first transaction package, wherein the root node affinity is a first root node affinity, wherein the tier one affinity is a first tier one affinity; the method further comprising:
   receiving a second transaction package;
   forming a second root node affinity associated with the second transaction package;
   comparing the second root node affinity with a second tier one affinity;
   based at least in part on the comparison, assimilating the second root node affinity with the second tier one affinity;
   comparing the second tier one affinity with the tier two affinity;
   based on the comparison of the second tier one affinity with the tier two affinity, performing a function selected from a group consisting of:
      generating a report indicating a result related to the comparison of the second root node affinity with the tier two affinity at a defined period; and
      initiating interdiction procedures in relation to the tier two affinity.

9. A method for graduated evaluation of value transfer transactions, the method comprising:
   receiving, by a computer system, a first transaction package;
   receiving, by the computer system, a second transaction package;
   receiving, by the computer system, a third transaction package;
   receiving, by the computer system, a fourth transaction package;
   forming, by the computer system, a first root node affinity associated with the first transaction package;
   forming, by the computer system, a second root node affinity associated with the second transaction package;
   forming, by the computer system, a third root node affinity associated with the third transaction package;
   forming, by the computer system, a fourth root node affinity associated with the fourth transaction package;
   comparing, by the computer system, the first root node affinity with the second root node affinity;
   based at least in part on the comparison of the first root node affinity with the second root node affinity, forming, by the computer system, a first tier one affinity;
   comparing, by the computer system, the first tier one affinity with the third root node affinity;
   based at least in part on the comparison of the first tier one affinity with the third root node affinity, converting, by the computer system, the first tier one affinity to a tier two affinity;
   comparing, by the computer system, the tier two affinity to the fourth root node affinity and to a second tier one affinity;

based at least in part on the comparison of the tier two affinity to the fourth root node affinity and to a second tier one affinity, performing, by the computer system, a function selected from a group consisting of:

generating, by the computer system, a report indicating a result related to the comparison of the tier two affinity with the fourth root node affinity and the second tier one affinity; and initiating, by the computer system, interdiction procedures in relation to the tier two affinity.

* * * * *

UNITED STATES PATENT AND TRADEMARK OFFICE
CERTIFICATE OF CORRECTION

| | |
|---|---|
| PATENT NO. | : 8,417,600 B2 |
| APPLICATION NO. | : 10/434409 |
| DATED | : April 9, 2013 |
| INVENTOR(S) | : Degen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2688 days.

Signed and Sealed this
Thirtieth Day of December, 2014

Michelle K. Lee
*Deputy Director of the United States Patent and Trademark Office*